United States Patent
Yuan et al.

(10) Patent No.: US 12,112,501 B2
(45) Date of Patent: Oct. 8, 2024

(54) LOCALIZATION OF INDIVIDUAL PLANTS BASED ON HIGH-ELEVATION IMAGERY

(71) Applicant: Deere & Company, Moline, IL (US)

(72) Inventors: Zhiqiang Yuan, San Jose, CA (US); Jie Yang, Sunnyvale, CA (US)

(73) Assignee: Deere & Company, Moline, IL (US)

( * ) Notice: Subject to any disclaimer, the term of this patent is extended or adjusted under 35 U.S.C. 154(b) by 333 days.

(21) Appl. No.: 17/354,147

(22) Filed: Jun. 22, 2021

(65) Prior Publication Data

US 2022/0405962 A1    Dec. 22, 2022

(51) Int. Cl.
| | | |
|---|---|---|
| G06F 18/24 | (2023.01) | |
| B25J 11/00 | (2006.01) | |
| G06T 3/40 | (2024.01) | |
| G06T 7/33 | (2017.01) | |
| G06T 7/73 | (2017.01) | |
| G06V 20/10 | (2022.01) | |

(52) U.S. Cl.
CPC .............. G06T 7/74 (2017.01); G06F 18/24 (2023.01); G06T 3/40 (2013.01); G06T 7/33 (2017.01); G06V 20/182 (2022.01); G06V 20/188 (2022.01); B25J 11/00 (2013.01); G06T 2207/10032 (2013.01); G06T 2207/20081 (2013.01); G06T 2207/30188 (2013.01)

(58) Field of Classification Search
CPC . G06F 18/24; G06T 7/33; G06T 2207/10032; G06T 2207/30184; G06T 2207/30188; G06V 10/751; G06V 20/188; G06V 20/182; B64C 39/024; A01C 21/007; A01D 46/30; A01M 21/00
See application file for complete search history.

(56) References Cited

U.S. PATENT DOCUMENTS 10,402,942 B2    9/2019    Taipale et al.
10,614,305 B2    4/2020    Muehlfeld et al.
(Continued)

OTHER PUBLICATIONS

Christiansen et al., "Designing and Testing a UAV Mapping System for Agricultural Field Surveying" Sensors 2017, 17, 2703; doe:10.3390/s17122703. 19 pages.
(Continued)

Primary Examiner — Shefali D Goradia
Assistant Examiner — D J Dhooge
(74) Attorney, Agent, or Firm — Hanley, Flight & Zimmerman, LLC

(57) ABSTRACT

Implementations are described herein for localizing individual plants using high-elevation images at multiple different resolutions. A first set of high-elevation images that capture the plurality of plants at a first resolution may be analyzed to classify a set of pixels as invariant anchor points. High-elevation images of the first set may be aligned with each other based on the invariant anchor points that are common among at least some of the first set of high-elevation images. A mapping may be generated between pixels of the aligned high-elevation images of the first set and spatially-corresponding pixels of a second set of higher-resolution high-elevation images. Based at least in part on the mapping, individual plant(s) of the plurality of plants may be localized within one or more of the second set of high-elevation images for performance of one or more agricultural tasks.

20 Claims, 8 Drawing Sheets

(56) References Cited

U.S. PATENT DOCUMENTS

| | | | | |
|---|---|---|---|---|
| 2017/0061052 | A1* | 3/2017 | Gates | G06N 5/04 |
| 2017/0358106 | A1* | 12/2017 | Yoshimura | G06T 7/0012 |
| 2019/0205610 | A1* | 7/2019 | Muehlfeld | G06T 5/50 |
| 2020/0126232 | A1* | 4/2020 | Guo | G06N 7/023 |
| 2020/0294620 | A1* | 9/2020 | Bauer | G06V 20/188 |
| 2020/0401883 | A1* | 12/2020 | Yang | G05D 1/0033 |

OTHER PUBLICATIONS

Demange "Next-generation positioning for direct georeferencing of multispectral imagery from an Unmanned Aerial System (UAS)" University of Tasmania, Australia. dated Jun. 7, 2019. 85 pages.

Grayson et al., "GPS Precise Point Positioning for UAV Photogrammetry" The Photogrammetric Record (2018). doi:10.1111/phor.12259. 21 pages.

Laliberte et al., "Acquisition, Orthorectification, and Object-based Classification of Unmanned Aerial Vehicle (UAV) Imagery for Rangeland Monitoring" Photogrammetric Engineering & Remote Sensing. vol. 76, No. 6, Jun. 2010. pp. 661-672.

Hobbs et al., "Large-Scale Counting and Localization of Pineapple Inflorescence Through Deep Density-Estimation" Original Research. doi:10.3389/fpls.2020.599705 dated Jan. 28, 2021. 14 pages.

Dev Nakarmi "Automated inter-plant spacing sensing of corn plant seedlings and quantification of layering hen behaviors using 3D computer vision" (2013). Graduate Theses and Dissertations. 13313 https://lib.dr.ia.state.edu/etd/13313. 140 pages.

Kraemer et al., "From Plants to Landmarks: Time-invariant Plant Localization that uses Deep Pose Regression in Agricultural Fields" arXiv:1709.04751v1 [cs.RO] dated Sep. 14, 2017. 6 pages.

Ambrozowicz "Weed Detection Using Machine Learning—A game changer in agriculture" https://picterra.ch/blog/weed-detection-using-machine-learning/ dated Mar. 2, 2020. 10 pages.

Molina "Unmanned aerial systems for photogrammetry and remote sensing: A review" ISPRS Journal of Photogrammetry and Remote Sensing 92 (2014) pp. 79-97.

Rizk et al., "Real-Time SLAM Based on Image Stitching for Autonomous Navigation of UAVs in GNSS-Denied Regions" 2020 IEEE International Conference on Artificial Intelligence Circuits and Systems (AICAS) 4 pages.

Adel et al., "Image Stitching based on Feature Extraction Techniques: A Survey" International Journal of Computer Applications (0975-8887) vol. 99—No. 6, dated Aug. 2014. 8 pages.

* cited by examiner

LOCALIZATION OF INDIVIDUAL PLANTS BASED ON HIGH-ELEVATION IMAGERY

BACKGROUND

With large scale agriculture, crops typically are observed, measured, and/or interacted with in a relatively coarse manner. For example, data gathered from sparse sampling may be used to extrapolate crop yields, disease diagnoses, and/or pest presence/population for entire plots of plants. This can lead to less-than-ideal agricultural practices such as over/under application of fertilizer or other chemicals, over/under remediation of weeds and/or pests, and so forth. These agricultural practices may yield less than optical crop yields because healthy plants may be destroyed or damaged, unhealthy plants may be inadequately remediated, etc.

"Precision agriculture" refers to techniques for observing, measuring, and/or interacting with (e.g., harvesting, applying chemicals, pruning, etc.) crops in a highly targeted and granular manner, including at the level of individual, localized plants. Precision agriculture may improve crop yields and increase agricultural efficiency and/or land use overall. As agricultural robots become increasingly available and capable, precision agriculture has become more feasible, technologically and economically, with localization of individual plants being a key feature. However, existing plant localization techniques suffer from various shortcomings, such as being computationally expensive, error-prone, and/or too time-consuming.

SUMMARY

Implementations are described herein for localizing individual plants by processing high-elevation images with multiple different resolutions. Rather than blending or fusing a global image together from multiple high-elevation images—which as noted previously can be computationally expensive—multiple high-elevation images of relatively low resolution (referred to herein as "lower-resolution images") may be aligned such that invariant anchor points across different lower-resolution images can be localized relative to each other. With the invariant anchor points localized, mappings (or "projections") can be generated between pixels of the lower-resolution images and pixels of other high-elevation images that capture the same plurality of plants at a greater resolution, and thus are referred to herein as "higher-resolution images." For example, individual pixels in the lower-resolution images may be mapped to groups of pixels in the higher-resolution images. Based on these mappings, individual plants, which may not be easily discernible in the lower-resolution images, can be localized in the higher-resolution images.

In some implementations, a method for localizing one or more individual plants of a plurality of plants may be implemented using one or more processors and may include: analyzing a first set of high-elevation images that capture the plurality of plants at a first resolution; based on the analyzing, classifying a set of pixels of the first set of high-elevation images as invariant anchor points; aligning high-elevation images of the first set based on one or more of the invariant anchor points that are common among at least some of the first set of high-elevation images; generating a mapping between pixels of the aligned high-elevation images of the first set and spatially-corresponding pixels of a second set of high-elevation images, wherein the second set of high-elevation images capture the plurality of plants at a second resolution that is greater than the first resolution; and based at least in part on the mapping, localizing one or more individual plants of the plurality of plants within one or more of the second set of high-elevation images for performance of one or more agricultural tasks.

In various implementations, the method may include downsampling the second set of high-elevation digital images to generate the first set of high-elevation digital images. In various implementations, the first set of high-elevation images may be captured at a first elevation and the second set of high-elevation images are captured at a second elevation that is less than the first elevation.

In various implementations, the localizing may include assigning position coordinates to the one or more individual plants based on position coordinates generated by an airborne vehicle that acquired the first or second set of high-elevation images. In various implementations, the localizing may include mapping the one or more individual plants to one or more rows of a plurality of rows in which the plurality of plants are arranged.

In various implementations, the method may include deploying one or more agricultural robots to the one or more localized individual plants to perform one or more of the agricultural tasks. In various implementations, the first or second set of high-elevation images may be acquired by an unmanned aerial vehicle (UAV).

In various implementations, the classifying may include processing the first set of high-elevation images based on one or more machine learning models that are trained to recognize one or objects known to be movement-invariant. In various implementations, the classifying may include processing the first set of high-elevation images based on one or more machine learning models that are trained to recognize lodged plants among the plurality of plants. In various implementations, the classifying may include detecting agricultural equipment in spatial proximity with the plurality of plants. In various implementations, the classifying may include detecting one or more water features or roads in spatial proximity with the plurality of plants.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
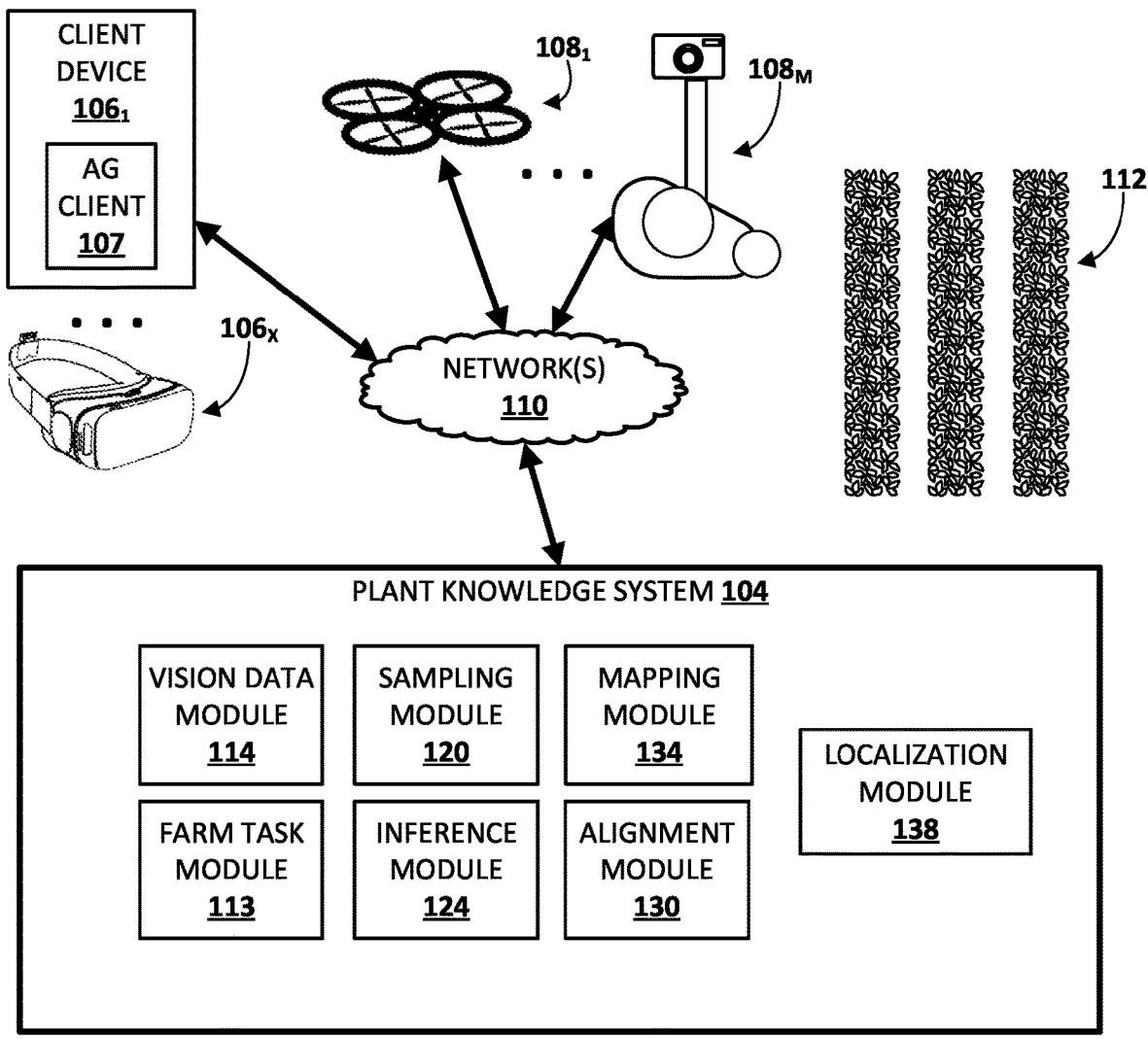
FIG. 1 schematically depicts an example environment in which selected aspects of the present disclosure may be employed in accordance with various implementations.

Numerous different technologies exist for identifying a type of a plant (i.e., classify the plant) based on image data, but these technologies are not concerned with localizing individual plants. However, the ability to localize individual plants may be useful for a variety of purposes. With precision agriculture, for instance, it may be beneficial to localize individual plants so that agricultural personnel and/or robots are able to locate and perform numerous agricultural tasks on individual plants. As another example, localizing individual plants may allow for tracking of individual plants' growth (or lack thereof), disease progression, fruit development (or lack thereof), and so forth. Tracking these metrics enables other applications, such as distinguishing portions of crop fields that are not meeting growth expectations (e.g., due to disease, insufficient or too much irrigation, insufficient or too much fertilizer, etc.) from other portions that are meeting growth expectations.

While individual plant localization is possible using land-based equipment such as robots, many crop fields and/or farms are exceedingly large, making land-based localization cumbersome at best and impractical at worst. Localization based on high-elevation imagery captured by airborne devices, such as a balloon or an unmanned aerial vehicle (UAV), may be performed more efficiently than land-based localization. However, air-based localization presents its own challenges.

In many cases, multiple high-elevation images captured by an airborne device such as a UAV are combined into a global image using a stitching or "mosaiking" for purposes of georeferencing individual plants based on position coordinates generated by the airborne device. However, given the typically high resolution of this imagery, stitching techniques that require calibration, registration, and/or blending/fusing may be too computationally expensive for real-time or near-real-time localization. While feature-based stitching techniques are faster than direct stitching techniques (e.g., Fourier analysis), they also present unique challenges in the agricultural context where highly-variant and homogenous-appearing crops tend to dominate other visual features. For instance, plants such as corn, soybean, wheat, oats, etc., may tend to sway and/or otherwise deform with the wind, introducing distortion into the stitching process.

Accordingly, techniques are described herein for localizing individual plants by processing high-elevation images of multiple different resolutions. Rather than blending or fusing a global image together from multiple high-elevation images—which as noted previously can be computationally expensive—multiple high-elevation images of relatively low resolution (referred to herein as "lower-resolution images") may be aligned such that invariant anchor points across different lower-resolution images can be localized relative to each other. With the invariant anchor points localized, mappings (or "projections") can be generated between pixels of the lower-resolution images and pixels of other high-elevation images that capture the same plurality of plants at a greater resolution, and thus are referred to herein as "higher-resolution images." For example, individual pixels in the lower-resolution images may be mapped to groups of pixels in the higher-resolution images. Based on these mappings, individual plants, which may not be easily discernible in the lower-resolution images, can be localized in the higher-resolution images.

In some implementations, a single set of high-elevation images may be acquired, e.g., by an airborne vehicle such as a UAV, from an elevation at which deformation of individual plants would be perceptible between the high-elevation images. For example, the images may be acquired at an elevation at which swaying of individual plants caused by the wind would introduce distortion into a conventional image stitching process. These high-elevation images correspond to the aforementioned higher-resolution images mentioned previously. In some implementations, the higher-resolution images may then be downsampled to generate the lower-resolution images.

In other implementations, the airborne vehicle may capture the higher-resolution and lower-resolution images separately. The higher-resolution images may be captured at a relatively low resolution, such as ten to fifty meters. Individual plants and/or deformation of individual plants may be perceptible at this elevation/resolution. The lower-resolution images may be captured at a greater elevation, e.g., one hundred meters, in which case individual pixels may not be sufficient to capture deformation of plants between frames.

In either case, lower-resolution images may be processed to identify invariant anchor points. These invariant anchor points may be used to align the lower-resolution images. Pixels of the aligned lower-resolution images—which need not be blended or fused into a global image—may be mapped (or projected) to pixels of the higher-resolution images. Then, individual plants may be localized in the higher-resolution images for subsequent (e.g., downstream) performance of agricultural tasks on those individual plants. These agricultural tasks may be performed automatically by agricultural robots who are deployed to the localized plants, or they may be performed by agricultural personnel who are provided with directions, a map, or other data they can use to find their way to the localized plants.

Invariant anchor points may include any visual feature that is not perceptively deformed (e.g., does not sway in the wind) from one high-elevation image to the next. Invariant anchor points may be man-made, natural, or any combination thereof. Man-made invariant anchor points may include, for instance, stationary or idle farm equipment, water features such as ponds, roads, trails, irrigation equipment such as sprinklers, valves, or pipes, flags, electrical units, fences, weather equipment, buildings, and so forth. Natural invariant anchor points may include, for instance, natural creeks or ponds, large and/or non-deformable trees or bushes, rocks, and so forth. Other invariant anchor points may include, for instance, holes in rows of plants where individual plants are missing or lodged (and hence, cannot sway in the breeze).

The localization performed using the higher-resolution images may be performed in various ways. In some implementations, the lower-resolution images (or the higher-resolution images, if aligned using anchor points) may be processed to generate a map of a plurality of rows of plants relative to a plurality of invariant anchor points. Individual plants may then be mapped to respective rows of the plurality of rows. Thus, for instance, an individual plant can be localized as being "three rows west and two plots north of invariant anchor point 1001." Anchor point 1001 itself may be localized as being "ten rows west and five plants south from field corner C."

In some implementations, the localization may include assigning position coordinates, such as Global Positioning System (GPS) coordinates, to individual plants. For example, if GPS coordinates of locations (especially three or more locations) such as invariant anchor points and/or field corners can be determined, then those GPS coordinates can be used to interpolate GPS coordinates of individual plants relative to those locations.

FIG. 1 schematically illustrates an environment in which one or more selected aspects of the present disclosure may be implemented, in accordance with various implementations. The example environment includes one or more agricultural areas 112 and various equipment that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural area(s) 112 may be used to grow various types of crops that may produce plant parts of economic and/or nutritional interest. Agricultural area(s) 112 may include, for instance, one or more plots of multiple rows of crops, one or more gardens, one or more greenhouses, or any other areas in which there may be an interest or desire to automatically detect, classify, and/or segment particular types of plants. Plants that are captured in digital imagery and analyzed using techniques described herein may take any form depending on the circumstances. Some plants may be considered desirable, and may include, for instance, strawberry plants, raspberries, sugar beets, soybeans, beans, corn, cabbage, lettuce, spinach, wheat, berries, etc. Other plants may be considered undesirable (e.g., weeds), and may include, for instance, dandelions, waterhemp, giant ragweed, marestail (also commonly known as horseweed), common lambsquarters, common groundsel, field pansy, mayweed or dog fennel, pineapple-weed or chamomile, several pigweeds, and white campion, yellow woodsorrel, yellow nutsedge, etc.

An individual (which in the current context may also be referred to as a "user") may operate one or more client devices $106_{1-X}$ to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") $106_X$ that provides an AR or VR immersive computing experience, a "smart" watch, and so forth. Additional and/or alternative client devices may be provided.

Plant knowledge system 104 is an example of an information system in which the techniques described herein may be implemented. Each of client devices 106 and plant knowledge system 104 may include one or more memories for storage of data and software applications, one or more processors for accessing data and executing applications, and other components that facilitate communication over a network. The operations performed by client device 106 and/or plant knowledge system 104 may be distributed across multiple computer systems.

Each client device 106 may operate a variety of different applications that may be used to perform various agricultural tasks, such as crop yield prediction, plant-part-of-interest inventory, crop disease diagnosis, etc. For example, a first client device $106_1$ operates agricultural ("AG") client 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

In some implementations, AG client 107 may be used to communicate to agricultural personnel instructions and/or information that can help them perform various agricultural tasks. For example, a farm task module 113 may generate a report, a map, instructions, and/or any other data that may be presented to an operator of a client device 106 using a graphical user interface, audibly, etc. These data may inform the agricultural personnel where targeted individual plants—e.g., weeds, crops ready to be harvested, diseased crops, underperforming or over-performing crops, pest-infested crops, etc.—are located (or "localized"), what action (s) should be taken on those plants, a timeframe in which those action(s) should be taken, etc.

In some implementations, one or more robots $108_{1-M}$ may be deployed to perform various agricultural tasks. An individual robot $108_{1-M}$ may take various forms, such as an unmanned aerial vehicle (UAV) $108_1$, a robot (not depicted) that is propelled along a wire, track, rail or other similar component that passes over and/or between crops, a wheeled robot $108_M$, or any other form of robot capable of being propelled or propelling itself past crops of interest. In some implementations, different robots may have different roles, e.g., depending on their capabilities. For example, in some implementations, one or more of robots $108_{1-M}$ may be designed to capture data, others may be designed to manipulate plants or perform physical agricultural tasks, and/or others may do both. Robots 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, lasers, barometers (for local weather information), photodiodes (e.g., for sunlight), thermometers, etc.

Figure 2:
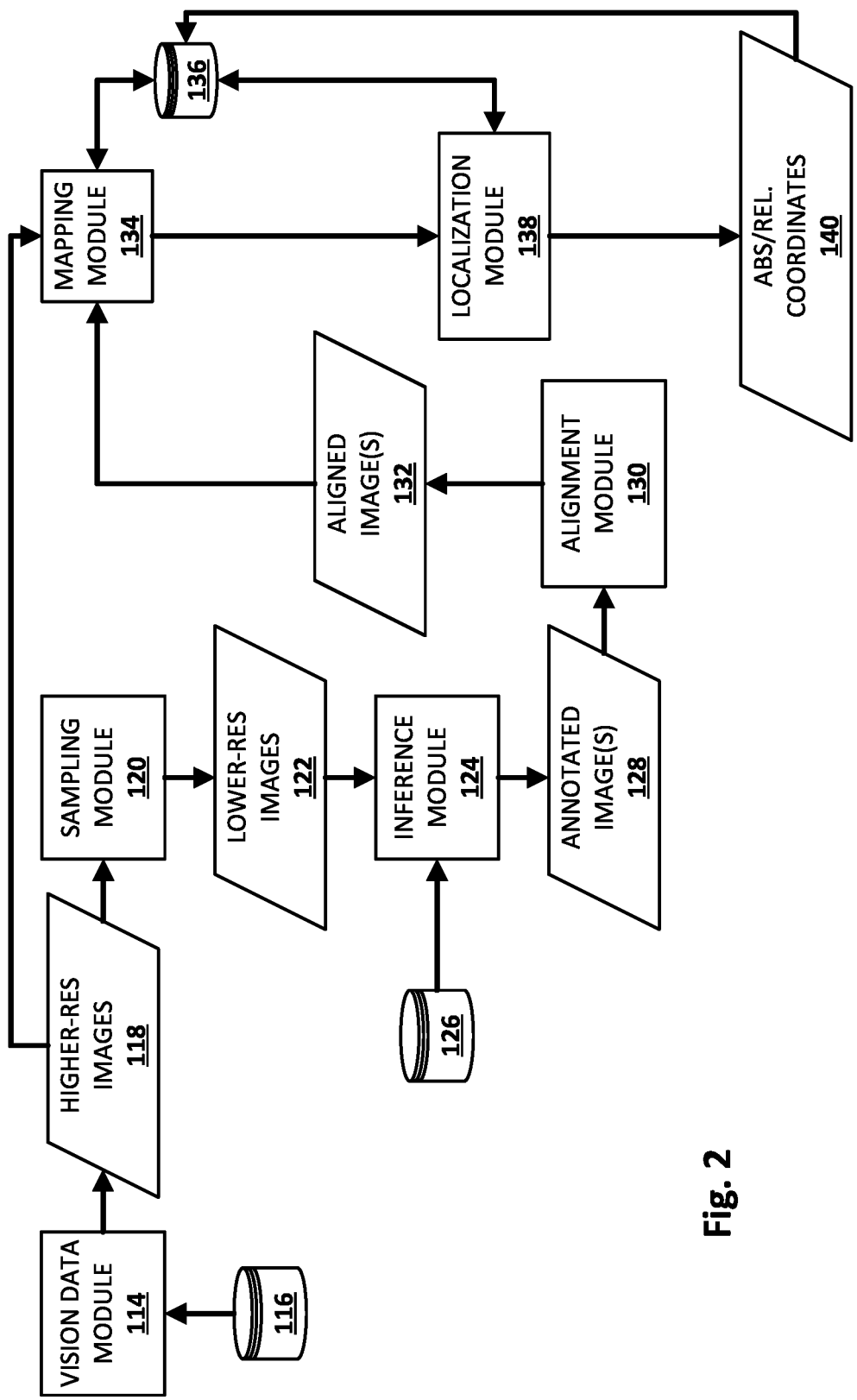
FIG. 2 schematically depicts an example of how components depicted in FIG. 1 may cooperate to implement selected aspects of the present disclosure.

In various implementations, plant knowledge system 104 may be implemented across one or more computing systems that may or may not be referred to as the "cloud." Plant knowledge system 104 may receive vision data generated by robots $108_{1-M}$ and/or any other sources of digital imagery capturing agricultural area 112, and process it using various image processing techniques to perform tasks such as plant localization, detection, classification, and/or segmentation. In various implementations, plant knowledge system 104 may include the aforementioned farm task module 113, a vision data module 114, a sampling module 120, an inference module 124, and alignment module 130, a mapping module 134, and a localization module 138. In some implementations one or more of modules 113, 114, 120, 124, 130, 134, and/or 138 may be omitted, combined, and/or implemented in a component that is separate from plant knowledge system 104. Plant knowledge system 104 may also include one or more databases, examples of which are depicted in FIG. 2. In this specification, the term "database" and "index" will be used broadly to refer to any collection of data. The data of the database and/or the index does not need to be structured in any particular way and it can be stored on storage devices in one or more geographic locations.

Referring now to FIG. 2, vision data module 114 may be configured to obtain digital images and/or other imagery data from various sources, such as an imagery database 116 purposed as an imagery clearinghouse, as well as from sources such as robots $108_{1-M}$ (particularly relevant to the present disclosure is high-elevation imagery captured by UAV $108_1$) and/or imagery captured by agricultural personnel. Vision data module 114 may then provide these imagery data to sampling module 120. For example, in FIG. 2, vision module data module 114 provides higher-resolution high-elevation images 118 to sampling module 120. In other implementations, vision data module 114 may be omitted and the functions described herein as being performed by vision data module 114 may be performed by other components of plant knowledge system 104, such as sampling module 120. In addition, in some implementations, high-elevation images may be captured at multiple different elevations/altitudes, in which case sampling module 120 may or may not be omitted.

Sampling module 120 may be configured to process higher-resolution high-elevation images 118 to generate lower-resolution high-elevation images 122. As implied by its name, in some implementations, sampling module 120 may downsample higher-resolution images 118—e.g., reduce their spatial resolution, reduce their dimensionality, etc.—to generate lower-resolution images 122. For example, sampling module 120 may determine one or more statistics about a given set of pixels in higher-resolution images 118, and then use those one or more statistics to populate a single pixel of lower-resolution images 122. Consequently, lower-resolution images 122 may depict the same plurality of plants, but may have a resolution that is lower than (e.g., half) of the resolution of higher-resolution images 118.

Inference module 124 may be configured to process lower-resolution images 122 received from sampling module 120 as input based on various machine learning models stored in machine learning model database 126 to generate output. This output may include classifications and/or annotations, at various levels of granularity, of various objects that are detected and/or segmented in imagery data received from vision data module 114. To this end, machine learning models stored in database 126 may be trained to detect, classify, and/or segment objects that are usable as invariant anchor points within high-elevation imagery, e.g., acquired by UAV $108_1$.

Various types of machine learning models may be trained to detect, classify, annotate, and/or segment particular objects usable as invariant anchor points in imagery data. In some implementations, a convolutional neural network ("CNN") may be trained (e.g., based on human-annotated ground truth images, based on synthetic training data, etc.) to generate output indicative of one or more types and/or categories of objects detected in digital imagery. In FIG. 2, for instance, inference module 124 generates annotated image(s) 128 that include pixel-wise or bounding-shape annotations identifying one or more detected objects that may or may not be usable as invariant anchor points. As noted previously, some objects that are not influenced by wind may be classified as invariant anchor points that are usable for image alignment.

Alignment module 130 may be configured to align annotated images 128 based on one or more invariant anchor points that are common among at least some of annotated images 128 to generate aligned images 132. For example, alignment module 130 may identify, from annotated images 128, annotated (e.g., pixel-wise annotated, bounding shape annotated) invariant anchor points such as stationary or idle farm equipment, lodged plants, holes in rows of plants, irrigation equipment such as sprinklers or cisterns, wells, water features, large stones or arrangements of smaller stones, roads, buildings, flags, indicia printed on mulch, etc. Alignment module 130 may also match one or more invariant anchor features identified in a first annotated image of annotated images 128 with the same one or more invariant anchor features in another annotated image of annotated images 128.

Alignment module 130 may perform this matching of invariant anchor points using various techniques. For example, alignment module 130 may compare distances between embeddings generated from invariant anchor points in embedding space. Additionally or alternatively, alignment module 130 may apply other techniques, such as appearance-based methods such as edge matching, divide-and-conquer, gradient matching, grayscale matching, histograms, and/or feature-based methods such as interpretation trees, pose clustering, geometric hashing, scale-invariant feature transform ("SIFT"), speeded up robust features ("SURF"), trained machine learning models (e.g., convolutional neural networks), bipartite graph matching, and so forth.

Based on the aligned high-elevation images 132 generated by alignment module 130, mapping module 134 may be configured to generate a mapping between pixels of the aligned high-elevation images 132 and spatially-corresponding pixels of higher-resolution high-elevation images 118. Based on this mapping, localization module 138 may be configured to localize one or more individual plants of a plurality of plants (e.g., a crop field) within any individual high-elevation image of higher-resolution images 118. For example, localization module 138 may store relative and/or absolute position coordinates 140 of the plant in a mapping/localization database 136. Relative position coordinates may include, for instance, directions to the plant from one or more reference points, such as one or more invariant anchor points, or inertial measurement unit (IMU) coordinates. Absolute position coordinates may include, for instance, GPS coordinates of the localized plant.

The localized plant data (e.g., absolute or relative position coordinates) 140 may be provided to farm task module 113 so that farm task module 113 can cause one or more agricultural tasks to be performed on the localized plant. These agricultural tasks may vary, and may include, but are not limited to, picking the plant, harvesting fruit from the plant, treating the plant with a chemical and/or fertilizer, trimming the plant, destroying the plant, etc. These agricultural tasks may be performed by agricultural personnel (e.g., by providing them with a map including directions to the localized plant) and/or by agricultural robots.

In some implementations, mapping module 134 may be further configured to generate maps of an agricultural area, which in some cases may be based on and/or incorporate localization data generated by localization module 138. For example, mapping module 134 may map one or more individual plants to one or more rows of a plurality of rows in which a plurality of plants are arranged. In some implementations, mapping module 134 may process aligned high-elevation images, e.g., generated by alignment module 130, to generate a map of the plurality of rows relative to the invariant anchor points. This map may be stored, for instance, in a mapping/localization database 136. In various implementations, farm task module 113 may use mapping data and localization data stored in database 136 to deploy humans and/or robots to perform agricultural tasks.

Figure 3:
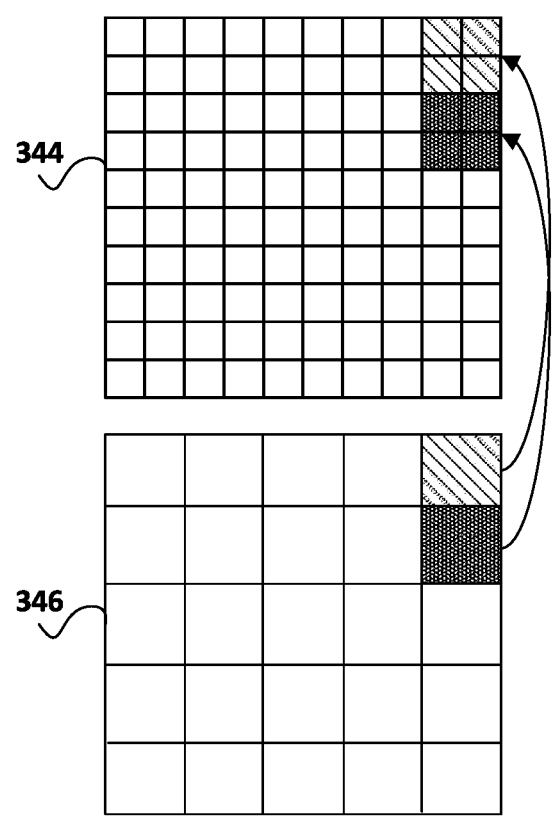
FIG. 3 schematically depicts an example of how pixels of lower-resolution images may be mapped to pixels of higher resolution images.

FIG. 3 schematically depicts an example of how a higher-resolution image 344, e.g., from higher-resolution images 118, may be mapped to a lower-resolution image 346, e.g., from lower-resolution images 122. Higher-resolution image 344 may have sufficient resolution that deformation of plants would be perceptible between higher-resolution image 344 and another higher-resolution image (not depicted) that shares at least some spatial overlap. By contrast, the resolution of lower-resolution image 346 is insufficient for deformation of plants to be perceptible between lower-resolution image 346 and another lower-resolution image (not depicted) that shares at least some spatial overlap.

Higher-resolution image 344 has ten rows and ten columns of pixels, and may have been captured, for instance, by UAV $108_1$ from an elevation such as ten to fifty meters, although other elevations are contemplated. Lower-resolution image 346 has five rows and five columns of pixels. Lower-resolution image 346 may have either been captured from a higher elevation than higher-resolution image 344, or may have been generated by downsampling higher-resolution image 344. Accordingly, and as indicated by the arrows (only two of which are provided) in FIG. 3, one pixel of lower-resolution image 346 maps to four pixels (two by two) of higher-resolution image 344.

Although individual plants may or may not be discernable in lower-resolution image 346, at least some invariant anchor points (e.g., landmarks, farm equipment, lodged plants, roads, trees, fences, etc.) will be. Thus, invariant anchor points may be usable to align lower-resolution image 346 with one or more other lower-resolution images (not depicted). The pixels of the aligned lower-resolution images that depict these invariant anchor points may then be mapped to spatially corresponding pixels of higher-resolution image 344, as indicated by the arrows in FIG. 3. Once the invariant anchor points are mapped in higher-resolution image 344, they can be used to localize individual plants within higher-resolution image 344, e.g., by assigning individual plants absolute and/or relative position coordinates.

In some implementations, if GPS coordinates are known or determinable for at least some invariant anchor points, then GPS coordinates can be interpolated for individual plants and/or other invariant anchor points for which GPS coordinates are not known. Similarly, in some implementations, if GPS coordinates are known for a pixel (or pixels) of lower-resolution image 346, then those GPS coordinates may be used, e.g., in combination with the resolution of higher-elevation image 344, to interpolate GPS coordinates for the individual pixels of higher-resolution image 344 and/or for individual plants of higher-resolution image 344. For example, depending on the elevation from which they are captured and native resolution employed by the camera, the resolutions of higher-resolution image 344 and lower-resolution image 346 may correspond to known spatial areas on land, such as one meter squared, ten meters squared, five centimeters squared, etc. These spatial areas may be used to interpolate GPS coordinates for pixels/objects/plants for which direct GPS coordinates are not known or readily obtainable.

Figure 4:
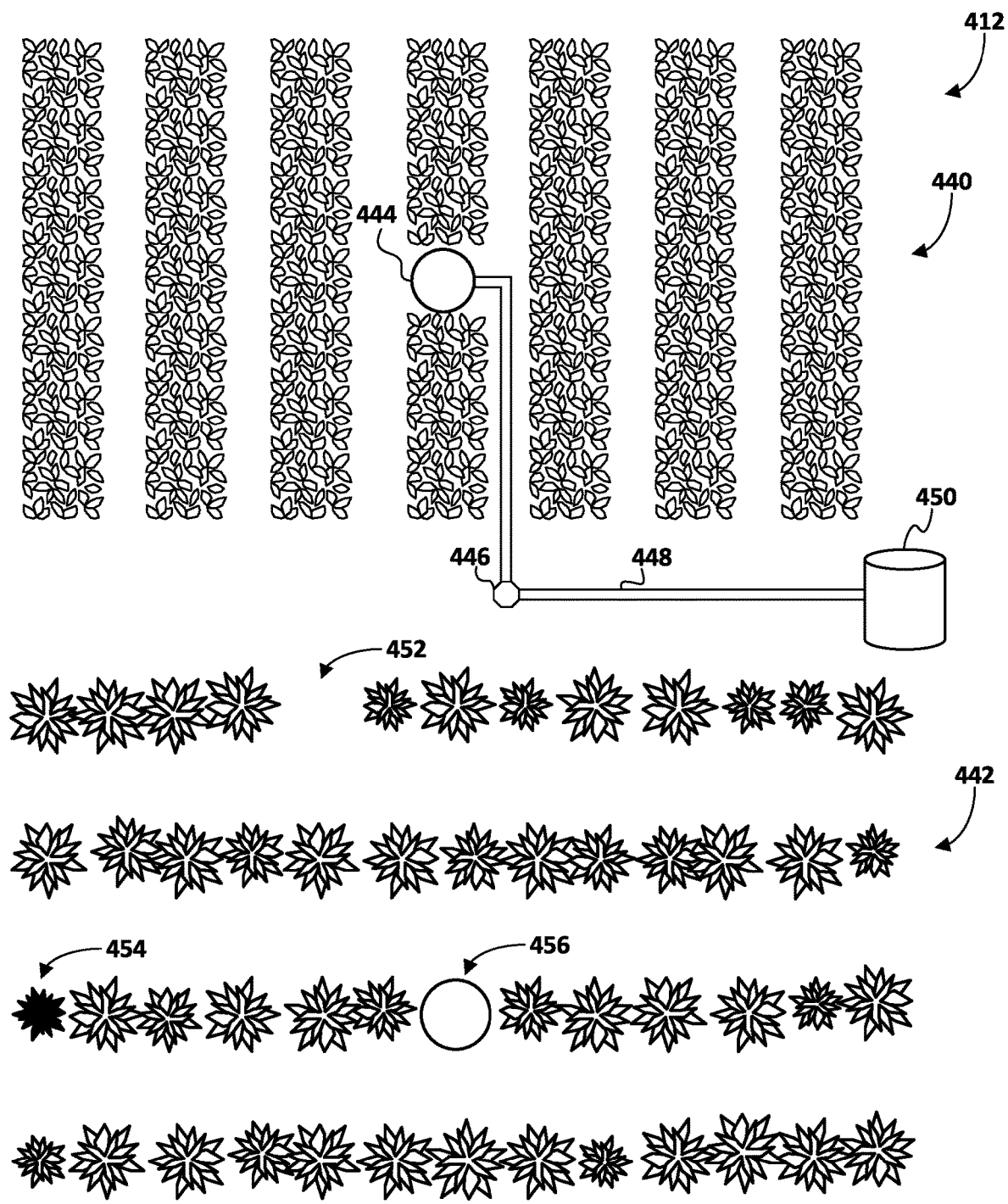
FIG. 4, FIG. 5, and FIG. 6 schematically demonstrate an example of how techniques described herein may be employed to align high-elevation images of an agricultural area for purposes of localization.
Figure 5:
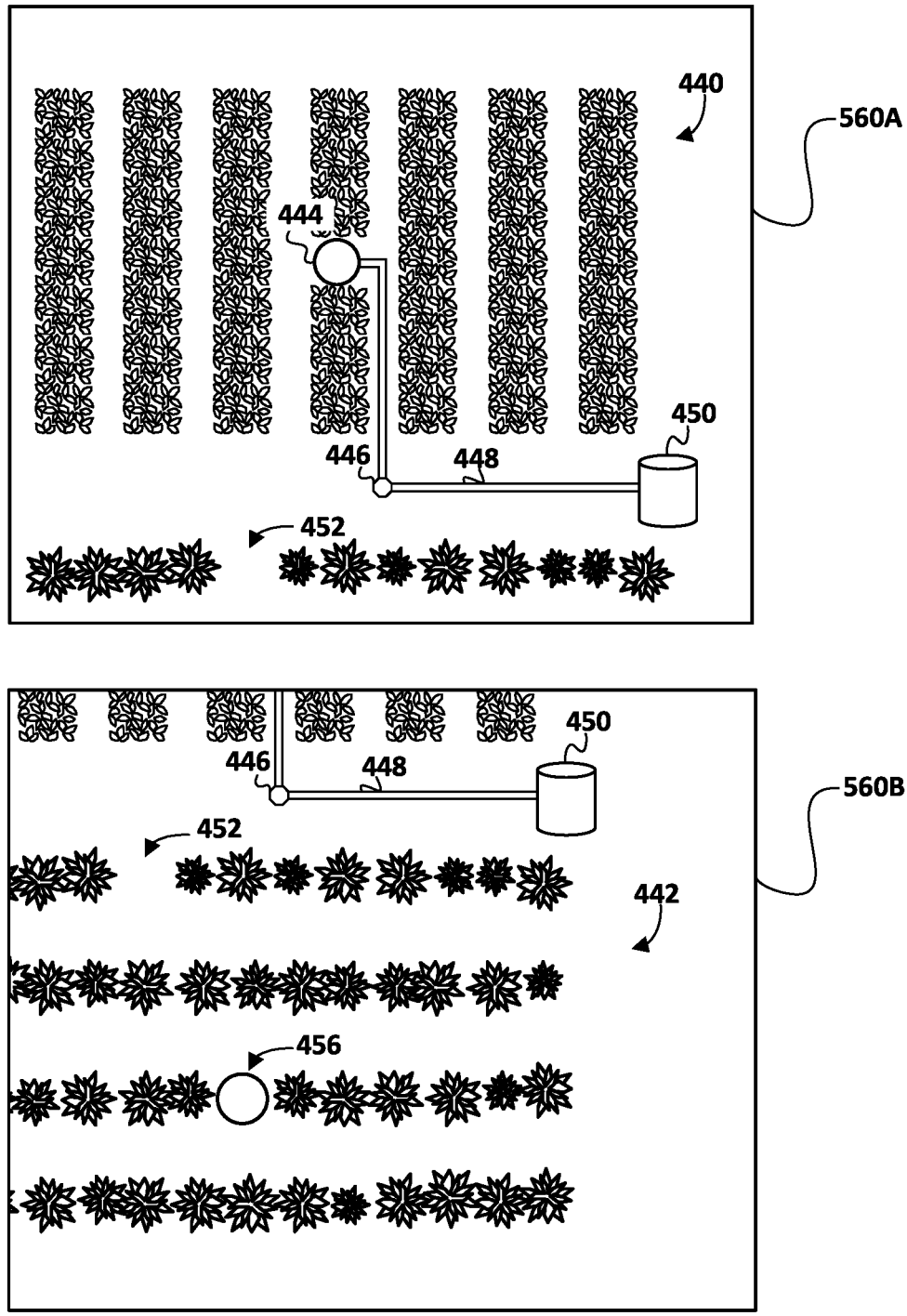
Figure 6:
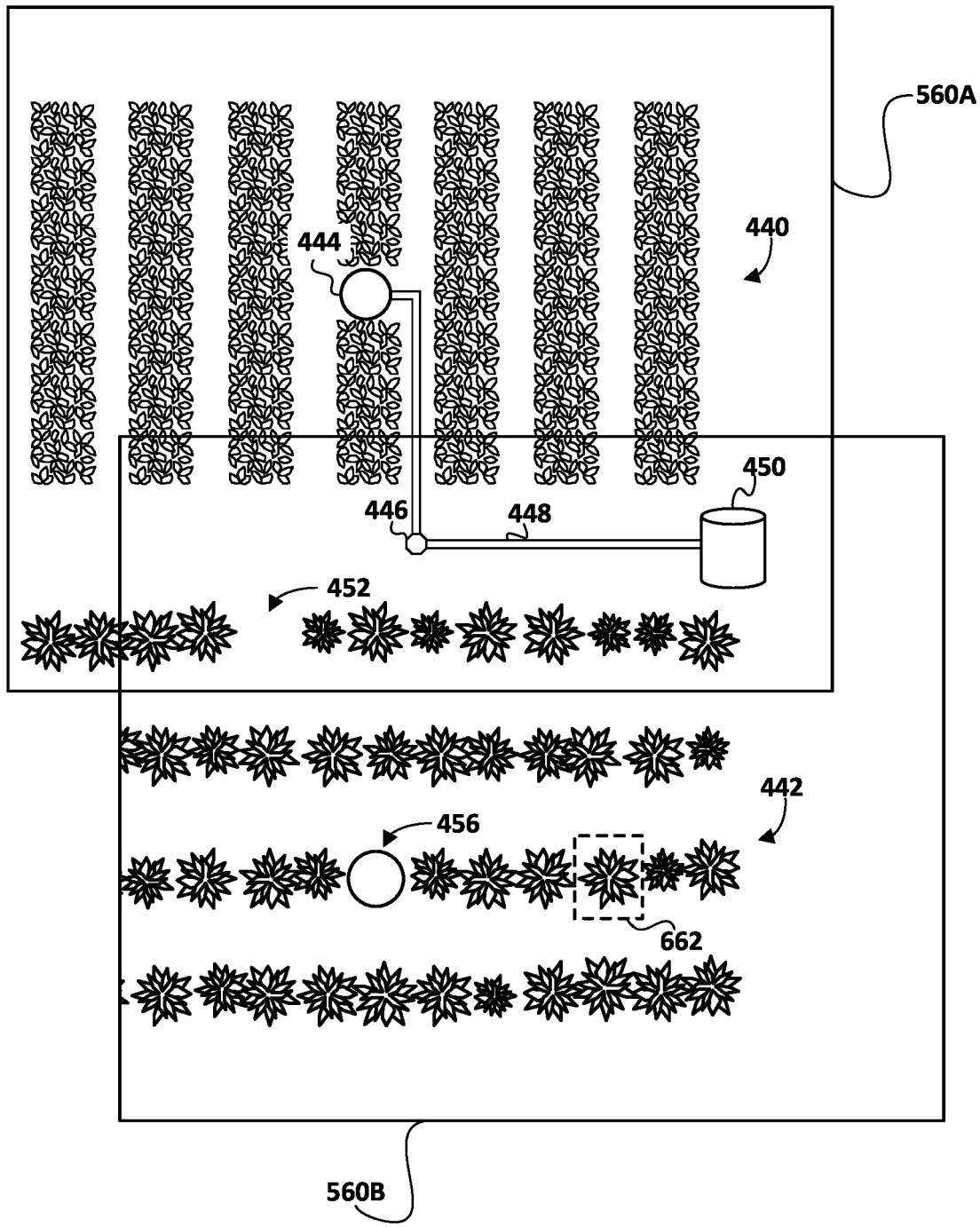

FIGS. 4-6 schematically depict an example of how lower-resolution images (e.g., 122, 346) may be aligned based on invariant anchor points. Similar techniques can be applied to higher-resolution images, e.g., with variant features such as plants being ignored or weighted less heavily. FIG. 4 depicts an agricultural area 412 that includes two plots, a first plot 440 up top and a second plot 442 at bottom. First plot 440 includes a plurality of vertical rows of crops of a first type. Second plot 442 includes a plurality of horizontal rows of crops of a second type. As mentioned previously, the crops depicted in plots 440, 442 may be deformable to some extent, e.g., in response to wind. This deformation would introduce distortions into a process of stitching a plurality of high-elevation images of agricultural area 412 captured by an airborne vehicle such as a UAV ($108_1$ in FIG. 1). Accordingly, in various implementations, inference module 124 may analyze high-elevation images of agricultural area 112, e.g., using one or more machine learning models such as one or more CNNs, to classify region(s) of high-elevation images as invariant anchor points.

Various candidate invariant anchor points are depicted in FIG. 4. A sprinkler 444 is disposed near the center of first plot 440. Sprinkler 444 is connected to a cistern 450 via piping 448 that passes through a piping junction 446. In second plot 442, an empty spot 452 is left cropless between crops of the top row of second plot 442. Another dead and/or lodged plant 454 (shaded in black) is located in the third row down of second plot 442 at far left. Also disposed in second plot 442 is a piece of farm equipment 456, such as a sprinkler, building, flag, etc. As these various features are relatively non-deformable (e.g., at least across two or more high-elevation images acquired during a short time interval, such as a UAV's flight), they may be classified as invariant anchor points.

FIG. 5 depicts two high-elevation, lower-resolution images 560A, 560B captured of agricultural area 412. These two images 560A, 560B may have been captured, for instance, during a sweep of UAV $108_1$ over agricultural area 412, or may have been generated by downsampling higher-resolution images (e.g., 118, 344) captured by UAV $108_1$. A number of the invariant anchor points depicted in FIG. 4 are also visible in these images 560A, 560B. For example, sprinkler 444, junction 446, piping 448, cistern 450, and empty spot 452 are all visible in first high-elevation image 560A. Sprinkler 444, junction 446, piping 448, cistern 450, empty spot 452, and farm equipment 456 are all visible in second high-elevation image 560B.

In various implementations, alignment module 130 may be configured to align high-elevation images 560A, 560B, which were previously annotated by inference module 124 to identify regions with invariant anchor points. In various implementations, this alignment may be based on one or more of the invariant anchor points that are common among the high-elevation images. In FIG. 5, for instance, anchor points 446, 448, 450, and 452 are visible in both high-elevation images 560A, 560B. Thus, alignment module 130 may utilize some or all of these common invariant anchor points 446, 448, 450, and 452 to align first high-elevation image 560A and second high-elevation image 560B. An example of these two images aligned using these common invariant anchor points 446, 448, 450, and 452 is depicted in FIG. 6.

Once the images 560A, 560B are aligned as depicted in FIG. 6 (and as represented at 132 of FIG. 2), mapping module 134 may generate mapping(s) from pixels of lower-resolution images 560A, 560B to pixels of higher-resolution images (not depicted, e.g., 118, 344). Based on these mappings, localization module 138 may localize the invariant anchor points relative to each other. For example, sprinkler 444 may be assigned a relative position coordinate of "three plants north of junction 446, which is one row north and 4-3 plants east of empty spot 452." Similar relative position coordinates may be assigned, e.g., by localization module 138, to other invariant anchor points. With the invariant anchor points localized, individual plants can also be localized within higher-resolution images, e.g., without having to perform a full conventional stitching process (e.g., blending/fusing can be skipped). For example, one plant 662 in second plot 442 can be localized relative to invariant anchor points, such as "on the same row and four plants east of farm equipment 456," and/or "three rows south and two plants west of cistern 450."

In some implementations, individual plants and/or invariant anchor points may be localized using absolute position coordinates, in addition to or instead of relative position coordinates. For example, GPS coordinates of particular visual features, such as corners of plots 440, 442, may be known and/or ascertainable from a GPS coordinate of UAV $108_1$. If multiple GPS coordinates are ascertained for multiple invariant anchor points in a given high-elevation image, then it is possible to interpolate GPS coordinates for individual plants relative to those invariant anchor point GPS coordinates.

Figure 7:
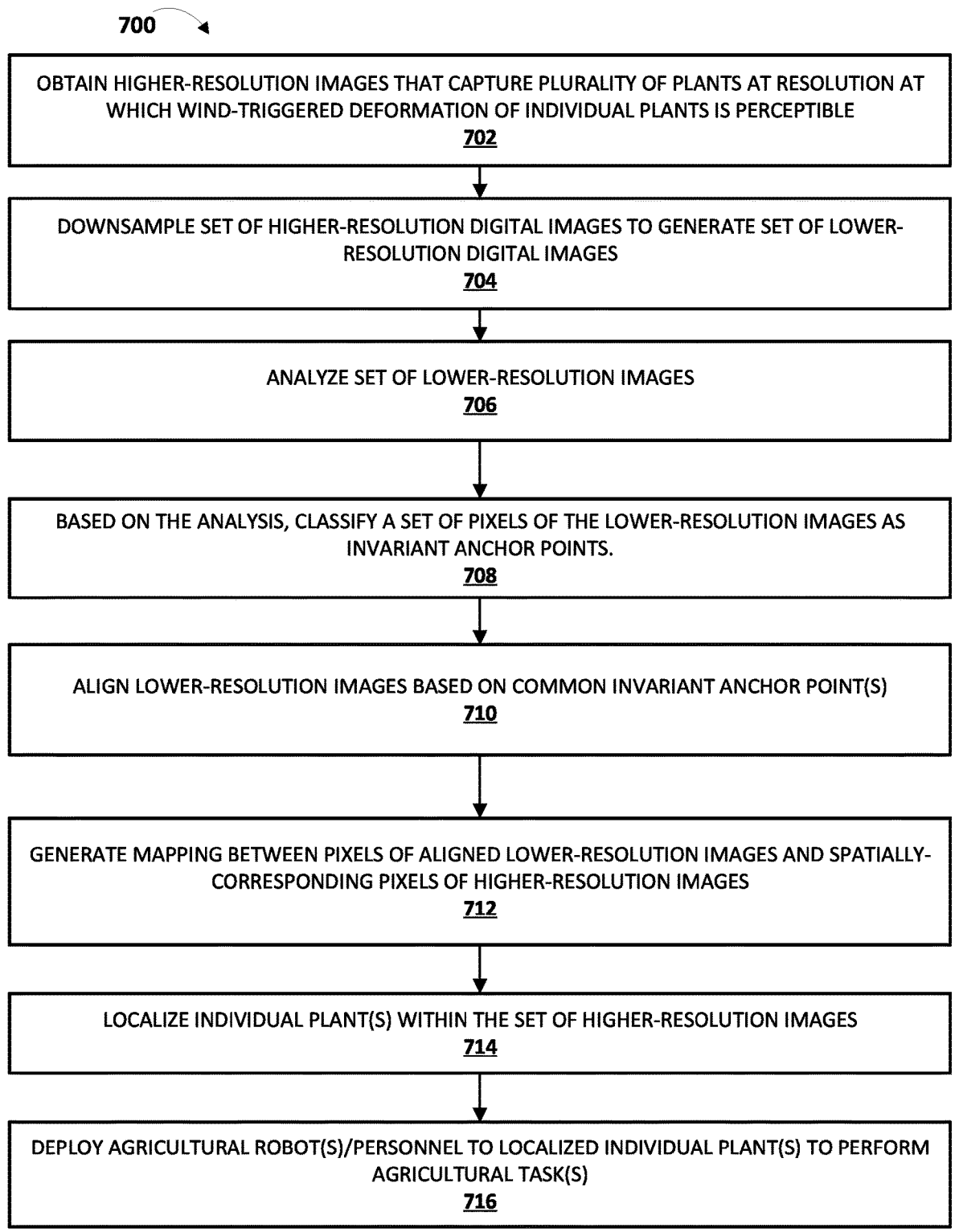
FIG. 7 is a flowchart of an example method in accordance with various implementations described herein.

FIG. 7 illustrates a flowchart of an example method 700 for localizing one or more individual plants of a plurality of plants. The operations of FIG. 7 can be performed by one or more processors, such as one or more processors of the various computing devices/systems described herein, such as by plant knowledge system 104. For convenience, operations of method 700 will be described as being performed by a system configured with selected aspects of the present disclosure. Other implementations may include additional operations than those illustrated in FIG. 7, may perform step(s) of FIG. 7 in a different order and/or in parallel, and/or may omit one or more of the operations of FIG. 7.

At block 702, the system may obtain higher-resolution images (e.g., 118, 344) that capture a plurality of plants at a resolution at which wind-triggered deformation of individual plants is (e.g., would be) perceptible between the high-elevation images. For example, UAV $108_1$ may be flown over agricultural area 112 or 412 at an elevation such as between ten and one hundred or more meters and may capture high-elevation, higher-resolution images (e.g., 118, 344) at some predetermined frequency, such as once every two seconds, once every three seconds, etc. In some implementations, these higher-resolution images may be obtained for plant knowledge system 104 by vision data module 114.

At (optional) block 704, the system, e.g., by way of sampling module 120, may downsample the set of higher-resolution digital images to generate a set of lower-resolution digital images (e.g., 122, 346). In other implementations, two different sets of high high-elevation images may be captured, one higher-resolution set (e.g., 118) at a first elevation and another, lower-resolution set at a second elevation that is greater than the first elevation.

Whichever the case, at block 706, the system, e.g., by way of inference module 124, may analyze the set of lower-resolution images (e.g., 122) that capture the plurality of plants at a first resolution. Based on the analysis at block 706, at block 708, the system, e.g., by way of inference module 124, may classify a set of pixels of the lower-resolution images as invariant anchor points.

In some implementations, to perform the classifying of lock 708, inference module 124 may apply various object recognition techniques (e.g., using one or more trained CNNs) to classify, as invariant anchor points, objects that are known to be insufficiently deformable or otherwise sufficiently invariant. As noted previously, these invariant anchor points may include, for instance, farm equipment, man-made structures, natural features that are not purely transient, dead/lodged plants, etc. In some implementations, a CNN may be trained to classify an individual plant into one of multiple categories, such as "pre-harvest," "healthy," "harvest-ready," "infested," "overwatered," "dead," and/or "lodged," to name a few. In some such implementations, plants classified into the "dead" or "lodged" categories may be treated as invariant anchor points, whereas plants classified into the other categories may be treated as variant feature points.

Referring back to FIG. 7, at block 710, the system, e.g., by way of alignment module 130, may align lower-resolution images of the set of lower-resolution images based on one or more of the invariant anchor points that are common or shared among at least some of the first set of high-elevation images. An example of how this alignment may occur was demonstrated in FIGS. 4-6.

At block 712, the system, e.g., by way of mapping module 134, may generate a mapping between pixels of the aligned lower-resolution images and spatially-corresponding pixels of the set of higher-resolution images. In some implementations, the system, e.g., by way of mapping module 134, may process the aligned high-elevation images to generate a map of a plurality of rows relative to the invariant anchor points. For example, object recognition processing may be applied to identify rows of plants in the digital images. These identified rows may be used by mapping module 134 to generate a map of an agricultural area that also includes invariant anchor points. The mapping may be performed by the system at any point relative to the other operations of method 700.

Based at least in part on the mapping generated at block 712, at block 714, the system, e.g., by way of localization module 138, may localize one or more individual plants of the plurality of plants within one or more of the set of higher-resolution images for performance of one or more agricultural tasks. In some implementations, object recognition processing may be applied to assign individual plants relative position coordinates. For example, a number of rows between a target plant and an invariant anchor point may be counted, e.g., via object recognition or using a map generated by mapping module 134, to assign the target plant a position such as "three rows south and two plants [or columns] west of cistern."

Unlike with conventional stitching-based localization techniques, with the alignment techniques described herein, it is not necessary to use a stitched and blended together composite image for localization. Rather, because individual invariant anchor points are localized relative to each other (and with GPS coordinates in some implementations), and because the mappings have been generated between pixels of lower-resolution and higher-resolution images depicting the same plants, one or more individual (e.g., unstitched) higher-resolution images can be used to localize an individual plant.

In some implementations, at block 716, the system, e.g., by way of farm task module 113, may deploy one or more agricultural robots and/or personnel to the one or more of the localized individual plants to perform one or more agricultural tasks. For example, in some implementations, in addition to localizing individual plants, other image processing techniques (e.g., trained machine learning models such as CNNs) may be applied to classify individual plants in the high-elevation images as being in need of some agricultural task. Weeds may be classified and targeted for remediation, e.g., via mechanical destruction (e.g., pulling) or via chemical application. Crops may be classified as ready for harvest or as being infested with pests. Based on these additional classifications, and based on the localizations determined using techniques described herein, agricultural robots (or agricultural personnel) may be deployed to perform various agricultural tasks.

Figure 8:
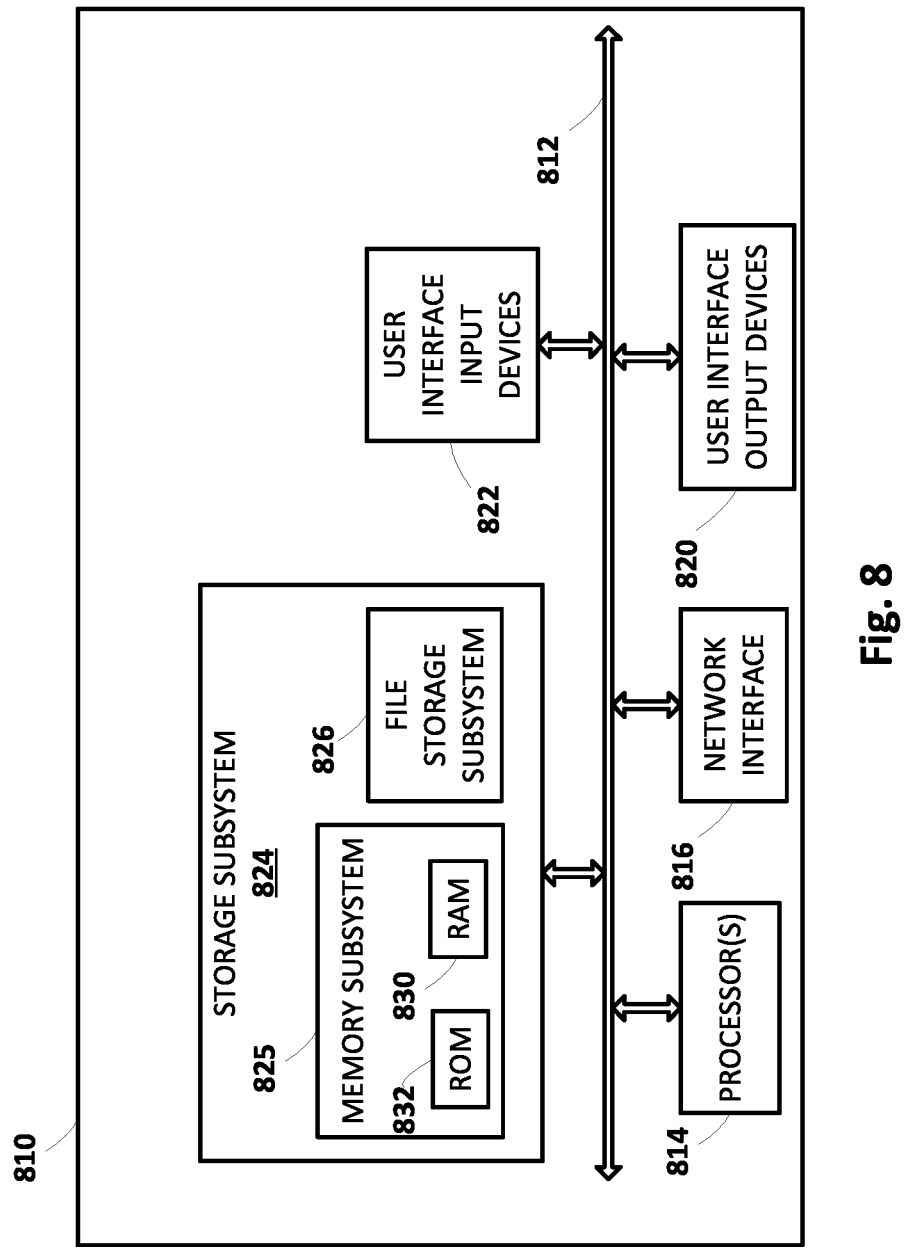
FIG. 8 schematically depicts an example architecture of a computer system.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 810 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of method 700 described herein, as well as to implement various components depicted in FIGS. 1-2.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for localizing one or more individual plants of a plurality of plants, the method implemented using one or more processors and comprising:
analyzing a first set of high-elevation images that capture the plurality of plants at a first resolution;
based on the analyzing, classifying a set of pixels of the first set of high-elevation images as depicting invariant anchor points, wherein the invariant anchor points include one or more visual features that are known to be movement-invariant;
aligning high-elevation images of the first set based on one or more of the invariant anchor points that are common among at least some of the first set of high-elevation images;
generating a mapping, based on the invariant anchor points, between pixels of the aligned high-elevation images of the first set and spatially-corresponding pixels of a second set of high-elevation images, wherein the second set of high-elevation images capture the plurality of plants at a second resolution that is greater than the first resolution; and based at least in part on the mapping, localizing one or more individual plants of the plurality of plants within one or more of the second set of high-elevation images for performance of one or more agricultural tasks.

2. The method of claim 1, further including downsampling the second set of high-elevation digital images to generate the first set of high-elevation digital images.

3. The method of claim 1, wherein the first set of high-elevation images are captured at a first elevation and the second set of high-elevation images are captured at a second elevation that is less than the first elevation.

4. The method of claim 1, wherein the localizing includes assigning position coordinates to the one or more individual plants based on position coordinates generated by an airborne vehicle that acquired the first set or the second set of high-elevation images.

5. The method of claim 1, wherein the localizing includes mapping the one or more individual plants to one or more rows of a plurality of rows in which the plurality of plants are arranged.

6. The method of claim 1, further including deploying one or more agricultural robots to the one or more localized individual plants to perform one or more of the agricultural tasks.

7. The method of claim 1, wherein the first set or the second set of high-elevation images is acquired by an unmanned aerial vehicle (UAV).

8. The method of claim 1, wherein the classifying includes processing the first set of high-elevation images based on one or more machine learning models that are trained to recognize one or more objects known to be movement-invariant.

9. The method of claim 8, wherein the classifying includes processing the first set of high-elevation images based on one or more machine learning models that are trained to recognize lodged plants among the plurality of plants.

10. The method of claim 8, wherein the classifying includes detecting agricultural equipment in spatial proximity with the plurality of plants.

11. The method of claim 8, wherein the classifying includes detecting one or more water features or roads in spatial proximity with the plurality of plants.

12. A system for localizing one or more individual plants of a plurality of plants, the system comprising one or more processors and memory storing instructions that, in response to execution by the one or more processors, cause the one or more processors to:
analyze a first set of high-elevation images that capture the plurality of plants at a first resolution;
based on the analysis, classify a set of pixels of the first set of high-elevation images as depicting invariant anchor points, wherein the invariant anchor points include one or more visual features that are known to be movement-invariant;
align high-elevation images of the first set based on one or more of the invariant anchor points that are common among at least some of the first set of high-elevation images;
generate a mapping, based on the invariant anchor points, between pixels of the aligned high-elevation images of the first set and spatially-corresponding pixels of a second set of high-elevation images, wherein the second set of high-elevation images capture the plurality of plants at a second resolution that is greater than the first resolution; and
based at least in part on the mapping, localize one or more individual plants of the plurality of plants within one or more of the second set of high-elevation images for performance of one or more agricultural tasks.

13. The system of claim 12, further including instructions to downsample the second set of high-elevation digital images to generate the first set of high-elevation digital images.

14. The system of claim 12, wherein the first set of high-elevation images are captured at a first elevation and the second set of high-elevation images are captured at a second elevation that is less than the first elevation.

15. The system of claim 12, wherein the instructions to localize include instructions to assign position coordinates to the one or more individual plants based on position coordinates generated by an airborne vehicle that acquired the first set or the second set of high-elevation images.

16. The system of claim 12, wherein the instructions to localize include instructions to map the one or more individual plants to one or more rows of a plurality of rows in which the plurality of plants are arranged.

17. The system of claim 12, further including instructions to deploy one or more agricultural robots to the one or more localized individual plants to perform one or more of the agricultural tasks.

18. The system of claim 12, wherein the first set or the second set of high-elevation images is acquired by an unmanned aerial vehicle (UAV).

19. A non-transitory computer-readable medium for localizing one or more individual plants of a plurality of plants, the medium comprising instructions that, in response to execution of the instructions by a processor, cause the processor to:
analyze a first set of high-elevation images that capture the plurality of plants at a first resolution;
based on the analysis, classify a set of pixels of the first set of high-elevation images as depicting invariant anchor points, wherein the invariant anchor points include one or more visual features that are known to be movement-invariant;
align high-elevation images of the first set based on one or more of the invariant anchor points that are common among at least some of the first set of high-elevation images;
generate a mapping, based on the invariant anchor points, between pixels of the aligned high-elevation images of the first set and spatially-corresponding pixels of a second set of high-elevation images, wherein the second set of high-elevation images capture the plurality of plants at a second resolution that is greater than the first resolution; and
based at least in part on the mapping, localize one or more individual plants of the plurality of plants within one or more of the second set of high-elevation images for performance of one or more agricultural tasks.

20. The non-transitory computer-readable medium of claim 19, further including instructions to downsample the second set of high-elevation digital images to generate the first set of high-elevation digital images.

* * * * *